United States Patent [19]

Lang et al.

[11] Patent Number: 5,735,232
[45] Date of Patent: Apr. 7, 1998

[54] ANIMAL LITTER AND PROCESS FOR PRODUCING IT

[75] Inventors: Rüdiger Lang, Brey; Peter Schlimm, Montaubaur; Dietmar Lange, Vallendar; Rolf Hornig, Kirchlinteln-Luttum, all of Germany

[73] Assignee: EFFEM GmbH, Germany

[21] Appl. No.: 581,624

[22] PCT Filed: Jul. 20, 1994

[86] PCT No.: PCT/DE94/00845

§ 371 Date: Aug. 16, 1996

§ 102(e) Date: Aug. 16, 1996

[87] PCT Pub. No.: WO95/02956

PCT Pub. Date: Feb. 2, 1995

[30] Foreign Application Priority Data

Jul. 20, 1993 [DE] Germany .......................... 43 24 297.9
Aug. 23, 1993 [DE] Germany .......................... 43 28 285.7

[51] Int. Cl.⁶ ..................................................... A01K 29/00
[52] U.S. Cl. ............................................................ 119/171
[58] Field of Search ....................... 119/171, 172, 119/173

[56] References Cited

U.S. PATENT DOCUMENTS

| 3,921,581 | 11/1975 | Brewer ............................ 119/173 |
| 4,621,011 | 11/1986 | Fleischer et al. ................ 119/173 |
| 5,188,064 | 2/1993  | House .............................. 119/172 |
| 5,207,830 | 5/1993  | Cowan et al. . |
| 5,295,456 | 3/1994  | Lawson ........................... 119/172 |

FOREIGN PATENT DOCUMENTS

A 28 43 518  4/1980  Germany .
A 41 09 590  10/1992  Germany .

*Primary Examiner*—Thomas Price
*Attorney, Agent, or Firm*—Leonard J. Santisi

[57] ABSTRACT

Animal litter, especially, consisting of or containing a proportion of particles comprising at least one moisture-absorbent organic material and at least one flaked mineral material, and process for producing a special embodiment of this animal litter.

65 Claims, No Drawings

ANIMAL LITTER AND PROCESS FOR PRODUCING IT

The invention relates to an animal litter and to a process for producing a particular embodiment of this animal litter.

A known animal litter of the type described above consists of particles, which are built up completely from inorganic mineral material in granulate form. This mineral material may consist of granulates based on calcium silicate hydrate as well as of granulates based on clay minerals. These products have proven to be entirely satisfactory; however, the water absorption capacity and, in particular, the odor-binding capacity, seem capable of improvement.

Moreover, animal litter materials are also known, the individual parcels of which consist essentially of an organic material, such as treated waste paper or the like. In the case of these materials, the moisture absorption capacity is high, but there is frequently a problem with binding the odor.

It is an object of the invention to provide an animal litter of the generic type, which has a high water absorption capacity, good odor-binding properties and positive environmental properties. Moreover, a method is to be provided for producing a special embodiment of such an animal litter.

Pursuant to the invention, this objective is accomplished by an animal litter of or with a proportion of particles, which comprise at least one moisture-absorbing, organic material and at least one platelet-like mineral material.

The proportion of mineral material in the particles is between 5 and 25% by weight.

Pursuant to the invention, it is particularly preferred that the mineral material consists essentially of particles, which are identifiable visually as platelets (macroplatelets), the length to the thickness of these platelets being at least 10:1.

A mineral material of mica or of minerals similar to mica, such as vermiculite, particularly expanded vermiculite and especially one that has been comminuted to particles smaller than 2 mm, is particularly preferred.

The invention proposes that the particles contain an odor binder, which is distributed essentially uniformly and preferably comprises magnesium chloride, sodium chloride and/or calcium chloride.

Pursuant to the invention, it is particularly preferred that the moisture-absorbing organic material comprises cellulose, and especially the fraction of comminuted cellulose having a fiber length less than 1,500 µm.

The invention proposes that the particles comprise an inorganic and/or organic binder, which preferably is bentonite.

In an embodiment, which is particularly preferred pursuant to the invention, the individual particles in each case have a particle core, which comprises the liquid-absorbing organic material and optionally a portion of the platelet-like, mineral material, and a sheath, which essentially surrounds the particle core completely and contains the platelet-like mineral material.

Provisions can be made that the particle sheath is fixed to the particle core by a binder. This binder may comprise bentonite.

An odor binder, which is optionally present pursuant to the invention, may preferably be distributed essentially uniformly in the particle core.

Pursuant to the invention, the individual particles have an essentially roundish, oval shape. The invention proposes that the particles have a particle size of 0.5 to 8 mm and preferably of 3.3 to 6.5 mm.

The preferred bulk density of the inventive animal litter is 350–450 g/L.

The preferred residual moisture of the inventive animal litter is 5 to 15% by weight.

The preferred water absorption capacity of the inventive animal litter is 100 to 200% by weight.

The preferred pH of the inventive animal litter is 7 to 9.

The inventive method for producing an animal litter with particles, which consist of the previously described particle cores and particle sheaths, is distinguished owing to the fact that the particle cores are produced to begin with by pelletizing and that the particle cores subsequently are coated with the particle sheath.

Provisions can be made that, when an odor binder is used, it is incorporated into the particle cores during the pelletizing.

It is proposed that preferably, an odor binder-containing solution be used as a pelletizing aid. In particular, this solution can be a magnesium chloride solution. Even more preferred is a 33% magnesium chloride in an amount of 10 to 35% by weight relative to the weight of the particle core material, which is to be pelletized.

Alternatively, provisions can be made so that the odor binder is incorporated in solid (salt) form in the particle cores during the pelletizing.

The invention is based on the surprising realization that it is possible to accomplish the objective of the invention and provide an environmentally proper animal litter with outstanding use properties by making available a moisture-absorbing organic material and a platelet-like mineral material together in the particles of the inventive animal litter. In particular, it should be emphasized in this connection that, due to the simultaneous use of the two materials mentioned in each particle of the inventive animal litter, a hyperadditive effect for binding the odor results, which could not have been predicted and the magnitude of which was completely surprising to those skilled in the art.

This effect arises already upon simply mixing the two materials in the animal litter particles, presumably because of the larger internal surface area of the platelet-like material resulting from the mixing. When animal litter particles are used, for which the moisture-absorbing organic material is in the core of the particles and surrounded by the platelet-like mineral material in the form of a particle sheath, the platelet-like material results additionally in a special, geometric covering effect. The particle core, which may consist of the moisture-absorbing organic material, such as cellulose, alone or in admixture with the platelet-like, mineral material, such as vermiculite, has an outstanding water absorption capacity and, if it is provided with the platelet-like mineral material and, optionally, additionally with an odor binder, as is provided for preferably, contributes already itself to the binding of the odor.

Particularly if it is present in the form of macroplatelets, the platelet-like mineral material, which is applied as the particle sheath, can surround the particle core in very thin layers, which are permeable in the interstices to the incoming moisture. In contrast to material, which is not in the form of platelets, the particular advantage arises that especially short passageways to the moisture-absorbing organic material in the core are ensured for the moisture; on the other hand, when particle-shaped material is used, longer, frequently duct-shaped passages result, which overall delay and hinder the absorption of moisture.

As a result of the blocking action of the particle sheath, odor can subsequently force its way from the particle core once again to the outside only with difficulty. Moreover, due to the fact that it is built up from a mineral material, the particle sheath ensures with a high degree of reliability that the particle will not become tacky, so that there is no danger that the animal litter will be carried around in the residence, for example, by a cat.

Because of its components, the inventive animal litter is biocompatible to a high degree and can be disposed of in the toilet or by composting without any problems. The individual particles are practically dust-free, particularly if a particle sheath of platelet-like mineral material is used. The color of the animal litter is also a particular advantage of the particle sheath having the inventive construction, since the core is essentially made invisible by the particle sheath and, due to total reflection, the color of the animal litter corresponds largely to that of the platelet-like mineral material used and accordingly preferably is a beige-brown or a glossy gold.

Further distinguishing features and advantages of the invention arise out of the specification below, in which examples are explained in detail.

EXAMPLE 1

Crude cellulose (40.5% by weight) of a fraction with a fiber length less than 1,500 µm, 11.5% by weight of expanded vermiculite, 38.6% by weight of bentonite and 9.40% by weight of magnesium chloride in the form of a 33% aqueous solution were pelletized in a conventional, commercial Eirich mixer, until an essentially roundish, oval shape is attained.

After being dried to a residual moisture content of about 10% by weight, the animal litter had a bulk density of approximately 400 g/L, a water absorption of 160% by weight, a pH of 8.2 and a particle size of 3.4 to 5.2 mm. The fibers were beige-brown to a glossy gold. Over 7 days, the odor binding was less than 100 ppm (STIWA method).

EXAMPLE 2

Crude cellulose (44.8% by weight) of the fraction having a fiber length of less than 1,500 µm, 37.2% by weight of bentonite and 9.15% by weight of magnesium chloride in the form of a 33% aqueous solution were pelletized in a conventional, commercial Eirich mixer. Subsequently, the individual particle cores were coated once again in the Eirich mixer with a particle sheath, the raw material for the particle sheath comprising 7% by weight of vermiculite and 1.85% by weight of a binder (bentonite), the remainder being water.

The animal litter, so produced, had a bulk density of 400 g/L, a water absorption of 100% by weight, a residual moisture of 10, a pH of 8 and a particle size of 3.4 to 5.2 mm. The particles were roundish-oval. The color was beige-brown to a glossy gold. Over 7 days, the odor binding was less than 100 ppm (STIWA method).

EXAMPLE 3

The procedure of Example 2 was followed; however, 9.15% by weight of magnesium chloride and 3.15% by weight of sodium chloride, both in solid form, were used as odor binder and water was used as pelletizing aid.

The properties of the product, so obtained, were as follows: bulk density 330 g/L, water absorption 170% by weight, residual moisture content 12% by weight, pH 7.3, particle size 1.2 to 4.3, particle shape roundish-oval, color glossy gold to beige-brown. The odor binding over 6 days was less than 100 ppm (STIWA method).

The distinguishing features of the invention, disclosed in the above specification and in the claims, can be essential individually as well as in any combination for the realization of the invention in its various embodiments.

We claim:

1. Animal litter, particularly cat litter, from or with a proportion of particles, which comprise at least one moisture-absorbing, organic material and at least one platelet-like mineral material wherein the mineral material consists essentially of particles, which are usually identifiable as platelets (macroplatelets).

2. The animal litter of claim 1, wherein the proportion of mineral material in the particles is between 5 and 25% by weight.

3. The animal litter of claim 1, wherein the ratio of the length to the thickness of the platelets is at least 10:1.

4. The animal litter of claim 1 wherein the mineral material is selected from mica or minerals similar to mica.

5. The animal litter of claim 4 wherein the mineral material is vermiculite.

6. The animal litter of claim 5 wherein the vermiculite is expanded vermiculite.

7. The animal litter of claim 6 wherein the vermiculite is comminuted to less than 2 mm.

8. The animal litter of claim 1 wherein the particles contain an odor binder, which is distributed essentially uniformly.

9. The animal litter of claim 8 wherein the odor binder is magnesium chloride.

10. The animal litter of claim 8 wherein the odor binder is sodium chloride.

11. The animal litter of claim 8 wherein the odor binder is calcium chloride.

12. The animal litter of claim 1 wherein the moisture-absorbing, organic material is cellulose.

13. The animal litter of claim 12 wherein the cellulose is a fraction of comminuted cellulose with fiber length of less than 1500 µm.

14. The animal litter of claim 13 wherein the particles contain an inorganic and/or an organic binder.

15. The animal litter of claim 14 wherein the binder is bentonite.

16. The animal litter of claim 1 wherein the individual particles essentially have a roundish-oval shape.

17. The animal litter of claim 1 wherein the particles have a particle size of 0.5 to 8 mm.

18. The animal litter of claim 17 wherein the particles have a particle size of 3.3 to 6.5 mm.

19. The animal litter of claim 1 characterized by a bulk density of 350–450 g/L.

20. The animal litter of claim 1 characterized by a residual moisture content of 5 to 15%.

21. The animal litter of claim 1 characterized by a water absorption capacity of 100 to 200% by weight.

22. The animal litter of claim 1 characterized by a pH of 7 to 9.

23. Animal litter, particularly cat litter, from or with a proportion of particles, which comprise at least one moisture-absorbing, organic material and at least one platelet-like mineral material wherein the individual particles in each case have a particle core, which contains moisture-absorbing organic material and, a portion of the platelet-like mineral material, and a particle sheath, which surrounds the particle core essentially completely and contains the platelet-like mineral material.

24. The animal litter of claim 23 wherein the particle sheath is fixed to the particle core by a binder.

25. The animal litter of claim 24 wherein the binder includes bentonite.

26. The animal litter of claim 23 wherein the odor binder is distributed essentially uniformly in the particle core.

27. The animal litter of claim 23 wherein initially the particle cores are produced by pelletizing and subsequently, the particle cores are coated with the particle sheath.

28. The animal litter of claim 27 wherein the odor binder is incorporated during the pelletizing into the particle cores.

29. The animal litter of claim 28 wherein an odor binding solution is used as a pelletizing aid.

30. The animal litter of claim 29 wherein a magnesium chloride solution is used as a pelletizing aid.

31. The animal litter of claim 30 wherein a 33% magnesium chloride solution, in an amount of 10 to 35% by weight based upon the mass of the particle core material, which is to be pelletized, is used as a pelletizing aid.

32. The animal litter of claim 29 wherein the odor binder is incorporated into the particle core in solid (salt) form during pelletizing.

33. Animal litter, particularly cat litter, from or with a proportion of particles, which comprise at least one moisture-absorbing, organic material and at least one platelet-like mineral material, characterized in that the individual particles in each case have a particle core, which contains the moisture-absorbing, organic material and a particle sheath, which surrounds the particle core essentially completely and contains the platelet-like mineral material.

34. The animal litter of claim 33, wherein the proportion of mineral material in the particles is between 5 and 25% by weight.

35. The animal litter of claim 33, wherein the mineral material consists essentially of particles, which are visually identifiable as platelets (macroplatelets).

36. The animal litter of claim 35, wherein the ratio of the length to the thickness of the platelets is at least 10:1.

37. The animal litter of claim 33, wherein the mineral material is selected from mica or minerals similar to mica.

38. The animal litter of claim 37, wherein the mineral material is vermiculite.

39. The animal litter of claim 38, wherein the vermiculite is expanded vermiculite.

40. The animal litter of claim 38, wherein the vermiculite is comminuted to less than 2 mm.

41. The animal litter of claim 33, wherein the particles contain an odor binder, which is distributed essentially uniformly.

42. The animal litter of claim 41, wherein the odor binder is magnesium chloride.

43. The animal litter of claim 41, wherein the odor binder is sodium chloride.

44. The animal litter of claim 41, wherein the odor binder is calcium chloride.

45. The animal litter of claim 33, wherein the moisture-absorbing, organic material is cellulose.

46. The animal litter of claim 45, wherein the cellulose is a fraction of comminuted cellulose with fiber length of less than 1,500 μm.

47. The animal litter of claim 33, wherein the particles contain an inorganic and/or organic binder.

48. The animal litter of claim 47, wherein the binder is bentonite.

49. The animal litter of claim 33, wherein the particle sheath is fixed to the particle core by a binder.

50. The animal litter of claim 49, wherein the binder includes bentonite.

51. The animal litter of claim 33, wherein an odor binder is distributed essentially uniformly in the particle core.

52. The animal litter of claim 33, wherein the individual particles essentially have a roundish-oval shape.

53. The animal litter of claim 33, wherein the particles have a particle size of 0.5 to 8 mm.

54. The animal litter of claim 53, wherein the particles have a particle size of 3.3 to 6.5 mm.

55. The animal litter of claim 33, characterized by a bulk density of 350–450g/L.

56. The animal litter of claim 33, characterized by a residual moisture content of 5 to 15%.

57. The animal litter of claim 33, characterized by a water absorption capacity of 100 to 200% by weight.

58. The animal litter of claim 33, characterized by a pH of 7 to 9.

59. The animal litter of claim 33, wherein initially, the particle cores are produced by pelletizing and subsequently, the particle cores are coated with the particle sheath.

60. The animal litter of claim 59, wherein an odor binder is incorporated during pelletizing into the particle cores.

61. The animal litter of claim 60, wherein an odor-binding solution is used as a pelletizing aid.

62. The animal litter of claim 61, wherein a magnesium chloride solution is used as the pelletizing aid.

63. The animal litter of claim 62, wherein a 33% magnesium chloride solution, in an amount of 10 to 35% by weight based upon the mass of the particle core material, which is to be pelletized, is used as the pelletizing aid.

64. The animal litter of claim 60, wherein the odor binder is incorporated into the particle core in solid (salt) form during pelletizing.

65. The animal litter of claim 33, wherein the particle core contains a portion of the platelet-like mineral material.

\* \* \* \* \*

UNITED STATES PATENT AND TRADEMARK OFFICE
CERTIFICATE OF CORRECTION

PATENT NO. : 5,735,232
DATED : April 7, 1998
INVENTOR(S) : RÜDIGER LANG ET AL.

It is certified that error appears in the above-identified patent and that said Letters Patent is hereby corrected as shown below:

<u>COLUMN 4</u>

Line 37, "claim 13" should read --claim 1--.

Signed and Sealed this

Twenty-second Day of December, 1998

Attest:

BRUCE LEHMAN

Attesting Officer

Commissioner of Patents and Trademarks